Figure 1:
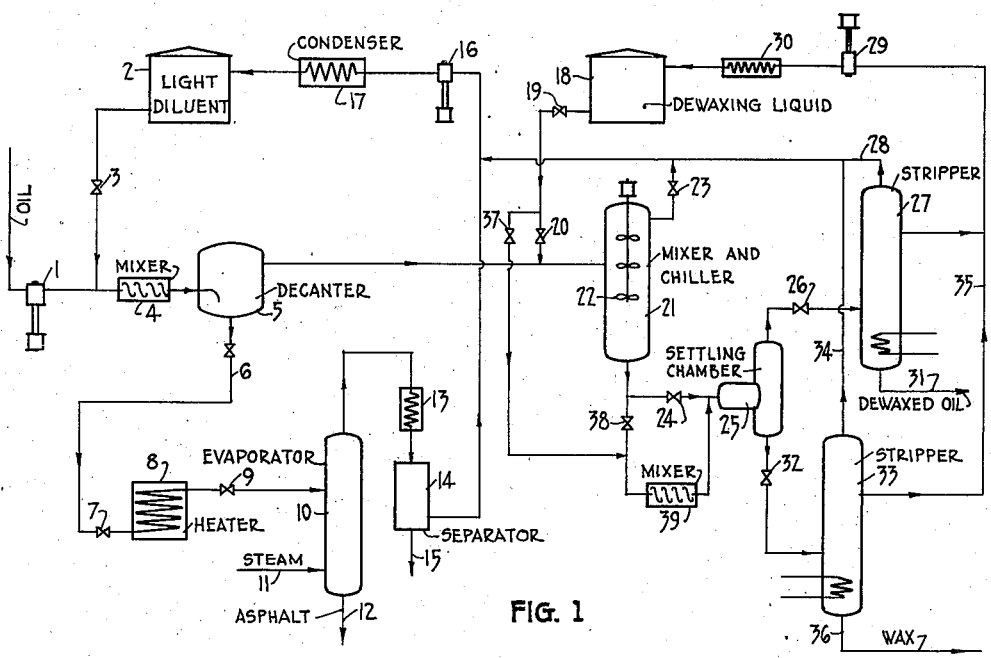

Dec. 27, 1938.  S. PILAT ET AL  2,141,361

DEWAXING PROCESS

Filed April 13, 1937

INVENTORS: Stanislaw Pilat
Marian Godlewicz
BY THEIR ATTORNEY:

Patented Dec. 27, 1938

2,141,361

UNITED STATES PATENT OFFICE 2,141,361

DEWAXING PROCESS

Stanislaw Pilat and Marian Godlewicz, Lwow, Poland, assignors to Shell Development Company, San Francisco, Calif., a corporation of Delaware Application April 13, 1937, Serial No. 136,564
In Poland April 21, 1936

18 Claims. (Cl. 196—18)

Prior processes for the treatment of oils containing wax involve the distillation of the oil into fractions and the separation of wax from the suitable oil fractions by crystallization and filter pressing.

There are also known processes for the treatment of mixtures containing paraffin wax comprising the dilution of the mixture with the solvent and chilling, as, for example, by the vaporization of light hydrocarbons, to form solid wax followed by the separation of the wax by filtration, decantation or centrifuging.

In such known processes the paraffin wax is separated in crystalline or amphorous state and subsequently the solid wax is separated from the liquid.

The substance of the present invention is a process for separating solid wax from liquid hydrocarbon oil by transferring the solid wax from the oil into a liquid which is immiscible with the oil, thus forming a suspension of the solid wax in said liquid; the wax suspension is then separated from the dewaxed oil.

It has been found that, when an oil which contains wax is mixed or mingled with a second liquid, which at the temperature of treatment is substantially immiscible with the oil and is a better wetting agent for solid wax than the oil to be dewaxed or the solution of the oil in a suitable diluent, the solid wax passes from the oil phase into the added liquid, either completely or partially, and may be separated with the latter, e. g., by decantation, from the oil. This second liquid we shall, in the present specification and claims, designate as the "dewaxing liquid".

The dewaxing process of the present invention, therefore, involves the separation of two liquid phases, which is technically far simpler than the separation of a solid phase from a liquid phase as in the known processes. The separation of the two liquid phases in the practice of this invention can be brought about by settling, centrifuging or in any other manner.

In accordance with the present process it is possible to treat mineral oil distillates, residues, wax bearing mineral oils, brown coal tar oils, shale oil, and synthetically produced oils, any of which may or may not have been previously treated with selective solvents to improve their viscosity indices or with precipitants for asphaltic material, or with other known chemical or physical treating agents. Since the wax bearing oils, in general, have a high viscosity and are readily adsorbed by solid wax, it was found to be desirable to reduce the viscosity and/or lower the affinity of the oil for the wax by the addition of a readily oil-miscible diluent which is a poor wetting agent for wax, and/or which will lower the viscosity of the oil. This diluent, moreover, should preferably be a poor solvent for solid wax at the dewaxing temperature. As a diluent of this type one may employ light hydrocarbons, like propane, butane, pentane, their corresponding olefines, gasoline, naphtha, oil gas, benzol, and its homologues, a mixture of benzol with acetone, methyl chloride, trichlorethylene, carbon tetrachloride, ethyl ether, methyl ether, and mixtures thereof is desired with the simultaneous addition of ethyl alcohol, propyl alcohol, butyl alcohol, or amyl alcohol, or any other similar solvent, which substantially lower the viscosity of the oil and dissolve the wax only to a slight extent.

These diluents can also advantageously be saturated under pressure with gases, such as, for example, methane, ethane, ethylene, water gas, natural gas, hydrogen, carbon dioxide, hydrogen chloride, their mixtures, and other gases, which are not liquefied under the conditions of the applied pressure and temperature.

As dewaxing liquids one may employ any organic liquid or mixture of liquids which is sparingly miscible or entirely immisicible with the diluted or undiluted wax-bearing oil at the dewaxing temperature and which is a preferential wetting agent for wax, as compared to the wetting power of the oil phase. As liquids of this type one may employ singly or in mixture: glycerine, glycols, phenol, cresols, nitrobenzene, furfural, aniline, or solutions of sugar or sulfonic acids, or soaps, in said liquids, or other suitable solvents. Other liquids which have a preferential wetting power for wax may also be employed as dewaxing liquids; they are preferably liquids having a higher viscosity than the oil phase at the wax-forming temperatures. The effectiveness of the dewaxing liquid is greatly increased by the addition of heavy oils, resins, or asphaltenes. Phenols, broadly, and particularly cresols, such as commercial cresylic acid, were found especially effective and form a preferred group.

In practicing the invention one may, first, dilute the initial oil with a suitable diluent, mix it with a dewaxing liquid, lower the temperature sufficiently to form two liquid phases and to crystallize the wax, allow the solid wax to separate from the oil phase and enter the dewaxing liquid to form a suspension; the suspension of the solid wax in the dewaxing liquid is then separated from the diluted dewaxed oil. One may also alter the sequence of these steps in that the precipitation of solid wax may first be brought about by lowering the temperature of the diluted or undiluted initial oil, after which the dewaxing liquid is added, into which the solid hydrocarbons enter to form a suspension. One may also operate by adding the dewaxing liquid at such a temperature that all or a large portion thereof is dissolved in the initial oil, after which the temperature is lowered causing the separation of the dewaxing liquid as a distinct liquid phase, together with the solids.

The quantity of the dewaxing liquid which is necessary for the complete dewaxing operation, depends upon the wax content of the initial oil and may for example, be from 20 to 50% for low wax content oils and from 100 to 200% for products having a high wax content. In some situations, particularly the treatment of raw oils which are rich in paraffins, a portion of the precipitated solid hydrocarbons will enter the dewaxing liquid only with difficulty and form a suspension in the upper phase, which is difficult to settle. In this case it was found to be very advantageous to add naphthalene or other readily crystallizable compounds, such as, for example, dinitrobenzene, phenanthrene, etc., bleaching clay or filter aids, which materials cause the precipitation of the solid hydrocarbons initially present in the oil in a more compact form, so that these may enter the dewaxing liquid without difficulty.

After the separation of the two liquid phases a dewaxed oil of low pour point can be obtained from the upper phase by distilling off the diluent, if this was used, and the small quantity of the dewaxing liquid which may be dissolved in the oil; the removal of this small quantity of the dewaxing liquid may in some cases be effected by extraction with a suitable solvent, such as water. The solid materials can be recovered from the lower phase either by distillation or by heating the separated lower phase to the melting point of the solids and decanting the melted wax from the dewaxing liquid which can then be circulated as regenerated dewaxing liquid. The recovered wax may be subjected to a further treatment by known methods such as, crystallization, distillation and the like.

Figure 2:
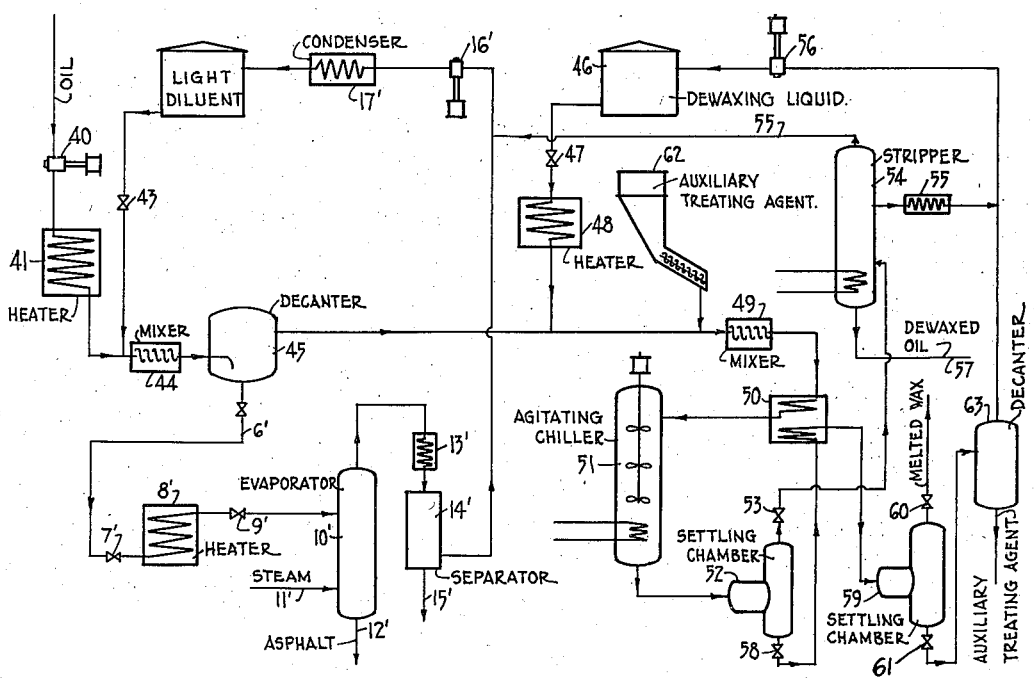

The invention may be further understood by referring to the accompanying drawing, in which Figures 1 and 2 are schematic flow diagrams indicating alternate modes of practicing the dewaxing process of the present invention, it being understood that these flow diagrams are exemplary only, and that numerous changes in the details of the process may be made within the scope and spirit of the invention as defined in the claims.

Referring to Figure 1, the wax bearing oil to be treated, such as a topped crude or a distillate is introduced into the system by means of pump 1, combined with a light diluent, such as propane, fed from tank 2 through valve 3, and mixed therewith in mixer 4. If the oil contains asphaltic or resinous materials, these may be separated from the solution of oil and diluent in the decanting vessel 5, the precipitated material being withdrawn through line 6. This material may be flashed through valve 7, heater 8, and pressure reducing valve 9 into evaporator 10 which may be operated at a low pressure. Steam may be introduced at 11 to reduce the asphalt, which is withdrawn at 12. The overhead vapors are passed through cooler 13 and separator 14, where condensed water and light oil are separated from the light diluent and withdrawn at 15; the latter is returned to tank 2 via pump 16 and condenser 17. The steps of precipitating and removing asphaltic material may be omitted, particularly when the initial oil is asphalt-free.

The solution of oil in the light diluent is withdrawn from the vessel 5 and combined with the dewaxing liquid, such as cresol, fed from the tank 18 via valves 19 and 20, and mixed therewith in the mixer and chiller 21, provided with agitating means 22. The dewaxing liquid and the oil may be combined at any desired temperature, such as ordinary temperature, at which the dewaxing liquid is only sparingly soluble in the diluted oil. In the mixer and chiller the resulting mixture is cooled to a temperature sufficiently low to precipitate wax in a solid form, the agitating means 22 being preferably operated during the chilling to mingle the dewaxing liquid with the solidified wax. The chilling may be effected by any suitable means, such as indirect cooling, or by vaporizing all or a portion of the light diluent, which may be withdrawn via valved line 23. The chilled mixture is intermittently or continuously withdrawn by means of valve 24 and introduced into settling chamber 25, where the mixture is permitted to stratify, forming an upper liquid phase rich in dewaxed oil and a lower liquid phase rich in the dewaxing liquid, and containing the solid wax in suspension.

The upper phase may be withdrawn intermittently or continuously through valve 26 and passed into stripping column 27 in which the light diluent (if any) and the dissolved or entrained dewaxing liquid are separated from the oil, the light diluent being returned to tank 2 via line 28, pump 16 and condenser 17, and the dewaxing liquid being returned via pump 29 and condenser 30. Dewaxed oil having a low pour point is withdrawn at 31, and may, if desired, be subjected to further refining.

The lower liquid phase may be similarly passed through valve 32 into the stripping column 33 for the separation of diluent, dewaxing liquid, and wax, which are withdrawn at 34, 35 and 36, respectively. Separate stripping or distilling columns may be provided for the removal of each of the constituents present in the liquid phases withdrawn from settling vessel 25. The wax withdrawn at 36 may be subjected to further distillation under high vacuum to separate it into high- and low-melting portions, or it may be further treated by sweating, recrystallization, contacting with clay, etc., by known methods.

As a modification of the described process, the wax-bearing oil or its solution in the light diluent may be chilled to precipitate wax prior to the addition of the dewaxing liquid. In this case valves 20 and 24 may be closed, and valves 37 and 38 opened, and the chilled oil from unit 21 combined with the dewaxing liquid and mixed therewith in mixer 39; the resulting mixture is then introduced into settling chamber 25, and treated as described above. The operation of agitating means 22 may in this case be dispensed with.

If desired, the mixture fed into settling chamber 25 may be saturated with a light gaseous treating agent which is above or near to its critical temperature, and is incapable of being liquefied under the conditions of the process. This has the effect of lowering the density of the light liquid phase. Suitable expansion and evaporating units may then be provided just preceding strippers 27 and 33 for separating the gas from the liquid phases withdrawn from settling chamber 25. Such treating agent may be introduced into the oil at any stage of the process, such as just after the chilling operation or, (particularly when indirect cooling is employed in chiller 21) together with the liquid diluent, thereby aiding in the separation of asphalt in the decanter 5.

Referring to Figure 2, the initial oil is fed by means of pump 40 through heater 41, wherein the oil is heated to a temperature sufficient to cause the dewaxing liquid to be completely soluble therein, or in its solution in the liquid diluent, when the latter is employed. Light diluent may be supplied from tank 42 via valve 43, mixed with the oil in mixer 44, and the resulting mixture fed into decanting vessel 45. Asphaltic material, if any, may be withdrawn through the valved line 6' and treated in installations 7' to 17' in the manner described in connection with Figure 1, similar primed reference cardinals designating similar items of equipment.

The decanted solution of oil is then combined with a stream of dewaxing liquid flowing from tank 46 through valve 47 and heater 48, and mixed therewith in mixer 49. The resulting homogeneous solution is cooled in heat exchanger 50 and chilled in agitating chiller 51 provided with cooling coils and stirrers, to cause the precipitation of solid wax. The chilled mixture is then introduced into settling chamber 52, which may be similar to settling chamber 25, and from which the two liquid phases may be intermittently or continuously withdrawn for treatment in the manner described in connection with Figure 1.

According to an alternate mode of treating the withdrawn liquid phases (which may also be applied to the process illustrated in Figure 1) the light liquid phase may be passed through valve 53 into stripping column 54 from which the light diluent is withdrawn at 55 and returned to tank 42 via pump 16' and condenser 17'; the dewaxing liquid may be condensed in condenser 55' and returned to tank 46 via pump 56; dewaxed oil having a low pour point is withdrawn at 57.

The heavy liquid phase, containing solid wax in suspension, is withdrawn through valve 58, may be warmed sufficiently to melt the suspended wax by flow through heat exchanger 59 and introduced into settling chamber 59, wherein the melted wax and the dewaxing liquid stratify into light and heavy liquid phases and may be withdrawn through valves 60 and 61, respectively. The melted wax may, if desired, be further distilled to free it from entrained dewaxing liquid and/or light solvent, and/or to separate it into fractions of different melting point. The dewaxing liquid may be returned to tank 46 via pump 56, since it normally contains only minor quantities of the light diluent. If desired the light diluent may, however, be removed therefrom by distillation or by washing prior to its return to tank 46.

The melting of the wax suspended in the lower phase from the settler 52 may be carried out stepwise, by controlling the heating so as to melt at first only the wax having the lowest melting temperature and permitting this to form a light liquid. After the separation of this layer the lower liquid layer in the settler 59, which still contains solid wax in suspension, may be further heated to melt the remaining wax or the dewaxing liquid can be removed from it by distillation or any other method. In this manner several wax fractions may be obtained.

In the treatment of highly paraffinic oils it is often desirable to introduce a solid or readily crystallizable auxiliary treating agent into the oil prior to the precipitation of solid wax. This may, for example, be introduced by means of hopper 62, if a solid material like clay is employed, or by equivalent means when it is introduced in the liquid state. It may be recovered either with the melted wax or with the dewaxing liquid withdrawn through valve 61, depending upon its melting point and density. If it is a heavy solid at the temperature of operation of settling chamber 59 it will be usually withdrawn through the valve 61 and may be separated from the dewaxing liquid in decanter 63.

*Example I*

1200 g. of a Boryslaw residue having a flash point of 231° C. a congealing temperature of 33° C. and a viscosity of 3.47° E. (about 117 sec. Say. Univ.) at 100° C. were diluted with 6 liters of diluent containing 83% propane, separated from the precipitate asphalt and mixed with 1200 g. of cresol. The resulting mixture was stirred and cooled to —25° C., and after settling and stratification the lower phase was withdrawn. It contained 728 g. of a product having a congealing point of +40° C., which was suspended in 1166 g. of cresol.

After expelling the propane and cresol the upper phase yielded 261 g. of an oil having a congealing temperature of +12° C. and a viscosity of 2.61° E. (about 86.3 sec. Say. Univ.) at 100° C.

*Example II*

1,000 g. of a paraffin-free residue from a Harklowa crude, having a congealing temperature of —1° C., spec. gravity 0.977, flash-point 234° C., and a viscosity of 7.89° E. (about 265 sec. Say. Univ.) at 100° C. were diluted with 83% propane. After separation of the asphalt, the solution contained 1 part of oil to three parts of propane. This solution was mixed with 500 g. of cresol and the temperature was lowered to —40° C., under agitation. After settling, the lower phase was drawn off; it contained 346 g. cresol and 185 g. of a product having a congealing point of +24° C. After expelling the propane and cresol from the upper phase, an oil of the following properties was obtained: Liquid at —18° C.; viscosity 3.5° E. (about 118 sec. Say. Univ.) at 100° C.; spec. gravity 0.9375. The yield of this oil was 60.5%.

As used in the present specification and claims the term "wax" is intended to designate hydrocarbons which are solid at normal temperatures, such as 0° C., or any fraction of a dewaxed oil, which fraction is solid at the treating temperature of this process. Such wax probably contains aliphatic hydrocarbons or naphthenic hydrocarbons with paraffinic side chains, but may include other types of hydrocarbons. The term "wax" is not intended to be restricted to mean paraffin wax.

We claim as our invention:

1. A process for separating wax from hydrocarbon oil containing the same by means of a dewaxing liquid which, at the temperature of the last step of the process, is at least partially immiscible with the oil and has a preferential wetting power for solidified wax sufficient to remove the solidified wax from the oil, comprising the steps of cooling said oil to solidify wax, mingling said cooled solidified wax with said dewaxing liquid, forming two liquid phases of different specific gravities of which the heavier one contains most of the dewaxing liquid and solidified wax suspended therein and the lighter one has a lower specific gravity than the suspension of solid wax in the heavier liquid phase and contains oil substantially free from solidified wax, and separating said heavier liquid phase together with suspended wax from the lighter liquid phase.

2. The process according to claim 1 in which the dewaxing liquid is combined with the oil prior to cooling the oil to solidify wax.

3. The process according to claim 1 in which the oil is cooled to solidify wax in the absence of said dewaxing liquid, and the dewaxing liquid is combined with the resulting cooled mixture of oil and solidified wax.

4. The process according to claim 1 in which the dewaxing liquid is substantially miscible with the oil at a higher temperature than the temperature at which said phases are separated, the dewaxing liquid and oil are combined and brought to said higher temperature prior to cooling to solidify wax, thereby forming a solution of dewaxing liquid in oil, and the dewaxing liquid is expelled from its solution in oil by the said cooling.

5. The process according to claim 1 in which the dewaxing liquid has a higher viscosity than the lighter liquid phase at the temperature at which said liquid phases are separated.

6. The process according to claim 1 in which the oil is diluted with an oil-solvent having a lower density than the oil and which does not dissolve solid wax readily.

7. The process according to claim 1 in which the oil is diluted with a quantity of a low-viscosity diluent having a lower density than the oil and which does not dissolve solid wax readily and is more miscible with the oil than with said dewaxing liquid, said quantity being sufficient to cause the said lighter liquid phase to have a lower viscosity than the dewaxing liquid and a lower density than the solidified wax at the temperature at which said liquid phases are separated.

8. The process according to claim 1 in which the oil is combined with a crystallization aid prior to cooling.

9. The process according to claim 1 in which the oil is saturated under superatmospheric pressure with a gas which is not condensible under the temperature and pressure at which said liquid phases are separated.

10. A process for separating wax from hydrocarbon oil containing the same by means of a dewaxing liquid which, at the temperature of the last step of the process, is at least partially immiscible with the oil and has a preferential wetting power for solidified wax in excess of that of the oil, comprising the steps of cooling said oil to solidify wax, mingling said cooled solidified wax with said dewaxing liquid, forming two liquid phases of different specific gravities of which the heavier one contains most of the dewaxing liquid and solidified wax suspended therein and the lighter one has a lower specific gravity than the solidified wax and contains oil substantially free from solidified wax, and separating said heavier liquid phase together with suspended wax from the lighter liquid phase.

11. A process for separating wax from hydrocarbon oil containing the same by means of a dewaxing liquid which, at the temperature of the last step of the process, is at least partially immiscible with the oil and is more viscous than the diluted oil, subsequently described, comprising the steps of diluting said oil with a low viscosity oil-miscible diluent having a lower density than the oil, cooling the oil to sodidify wax, mingling said cooled solidified wax with said dewaxing liquid in the presence of said diluent, forming two liquid phases of different specific gravities of which the heavier one contains most of the dewaxing liquid and solidified wax suspended therein and the lighter one has a lower specific gravity than the solidified wax and contains oil substantially free from solidified wax, and separating said heavier liquid phase together with suspended wax from the lighter liquid phase.

12. A process for separating wax from asphaltic hydrocarbon oil containing the same by means of a dewaxing liquid which, at the temperature of the last step of the process, is at least partially immiscible with the oil and has a preferential wetting power for solidified wax sufficient to remove the solidified wax from the oil, comprising the steps of diluting the oil with an oil-miscible diluent which is a precipitant for asphaltic material, separating the resulting precipitate from the diluted oil, cooling the deasphalted oil to solidify wax, mingling said cooled solidified wax with said dewaxing liquid, forming two liquid phases of different specific gravities of which the heavier one contains most of the dewaxing liquid and solidified wax suspended therein and the lighter one has a lower specific gravity than the suspension of solid wax in the heavier liquid phase and contains oil substantially free from solidified wax, and separating said heavier liquid phase together with suspended wax from the lighter liquid phase.

13. A process for separating wax from hydrocarbon oil containing the same by means of a dewaxing liquid which, at the temperature of the separation of the first liquid phases, subsequently described, is at least partially immiscible with the oil and has a preferential wetting power for solidified wax sufficient to remove the solidified wax from the oil, and which is capable of forming two liquid phases when in contact with liquid wax, comprising the steps of cooling said oil to solidify wax, mingling said cooled solidified wax with said dewaxing liquid, forming two first liquid phases of different specific gravities of which the heavier one contains most of the dewaxing liquid and solidified wax suspended therein and the lighter one has a lower specific gravity than the suspension of solid wax in the heavier liquid phase and contains oil substantially free from solidified wax, separating said first heavier liquid phase together with suspended wax from the lighter liquid phase, warming the separated heavier first liquid phase, containing suspended wax to melt at least a portion of the wax, forming second liquid phases of different specific gravities of which the heavier one contains most of the dewaxing liquid and the lighter one contains melted wax, and separating said second liquid phases.

14. The process according to claim 13 in which the heavier first liquid phase is warmed to a degree to melt only a portion of the suspended wax, and the heavier second liquid phase contains unmelted wax in suspension.

15. A process for fractionating wax to produce high melting and low melting wax fractions by means of a liquid having a wetting power for wax and capable of forming two liquid phases when in contact with melted wax at a temperature at which a portion of the initial wax is solid, comprising the steps of forming a suspension of solid wax in said liquid, warming said suspension to melt a relatively lower melting portion of the wax and to leave a relatively higher melting portion of the wax suspended in solid form in said liquid, forming two liquid phases of different specific gravities, of which the heavier one contains most of the said liquid and solid wax in suspension, and the lighter one contains melted wax, and separating said heavier liquid phase together with suspended wax from the lighter liquid phase.

16. A process for separating wax from hydrocarbon oil containing the same by means of a phenolic dewaxing liquid which, at the temperature of the last step of the process, is at least partially immiscible with the oil, comprising the steps of diluting said oil with a low-viscosity oil-miscible diluent having a lower density than the oil, cooling the resulting solution to solidify wax, mingling said cooled, solidified wax with said phenolic dewaxing liquid, forming two liquid phases of different specific gravities of which the heavier one contains most of the phenolic dewaxing liquid and solidified wax suspended therein and the lighter one has a lower specific gravity than the solidified wax and contains oil substantially free from solidified wax, and separating said heavier liquid phase together with suspended wax from the lighter liquid phase.

17. The process according to claim 16 in which the diluent is a hydrocarbon containing molecules of less than six carbon atoms.

18. The process according to claim 16 in which the phenolic dewaxing liquid is cresol.

STANISLAW PILAT.
MARIAN GODLEWICZ.